United States Patent
Kim

(10) Patent No.: US 7,079,683 B2
(45) Date of Patent: *Jul. 18, 2006

(54) METHOD FOR SETTING DOMINANT COLOR USING SPATIAL COHERENCY

(75) Inventor: Hyeon Jun Kim, Gyunggi-do (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 10/995,285

(22) Filed: Nov. 24, 2004

(65) Prior Publication Data

US 2005/0074166 A1    Apr. 7, 2005

Related U.S. Application Data

(63) Continuation of application No. 10/050,148, filed on Jan. 18, 2002, now Pat. No. 7,006,687.

(30) Foreign Application Priority Data

Jan. 18, 2001    (KR) ................. 2001-2985

(51) Int. Cl.
*G06K 9/00*    (2006.01)
(52) U.S. Cl. ............... 382/162; 382/164; 382/270
(58) Field of Classification Search ............... 382/162, 382/164, 165, 270
See application file for complete search history.

(56) References Cited

U.S. PATENT DOCUMENTS 6,430,312 B1 *   8/2002   Huang et al. ............... 382/165
6,542,632 B1 *   4/2003   Qian et al. ............... 382/165

FOREIGN PATENT DOCUMENTS

| EP | 1102212 | 5/2001 |
|---|---|---|
| WO | WO 99/34319 | 7/1999 |
| WO | PCT/KR00/00249 | 3/2000 |
| WO | WO 00/46748 | 8/2000 |

OTHER PUBLICATIONS

K.C. Ravishankar et al. "Dominant Color Region Based Indexing for CBIR" IEEE 0-7695-0040-4/99, Sep. 27, 1999, pp. 887-892.
K. Idrissi et al. "Multi-component Cross Entropy Segmentation for Color Image Retrieval" IEEE Cat. No. 01EX480, ISPA 2002, XP002252608, pp. 132-137.
Jens-Rainer Ohm et al. "A set of visual feature descriptors and their combination in a low-level description scheme" Signal Processing Image Communication, vol. 16, No. 1-2, Sep. 2000, pp. 157-179.

(Continued)

*Primary Examiner*—Phuoc Tran
(74) *Attorney, Agent, or Firm*—Fleshner & Kim, LLP

(57) ABSTRACT

A method is provided for setting a dominant color using a spatial coherency in order to improve performance of an image search function. The method includes describing an image region based on several dominant colors, a frequency of each dominant color, and a spatial coherency (SC) of the dominant color. In the method, the spatial coherency is non-uniformly quantized based on a predetermined threshold. For example, the spatial coherency (SC) may be ranged from 0 to 1 and the threshold may be set to 0.70.

6 Claims, 3 Drawing Sheets

OTHER PUBLICATIONS

John R. Smith et al. "Local Color and Texture Extraction and Spatial Query" IEEE 0-7803-3258X/96, Sep. 16-19, 1996, pp. 1011-1014.

Yong Rui et al. "Image Retrieval: Current Techniques, Promising Directions, and Open Issues" Academic Press 1047-3203/99, Mar. 1999, pp. 39-62.

Abdel-Mottaleb M. et al.; MPEG-7; A content description standard beyond compression; IEEE vol. 2, Aug. 8, 1999 pp. 770-777; XP010511065.

European Search Report Dated Mar. 18, 2005.

* cited by examiner

METHOD FOR SETTING DOMINANT COLOR USING SPATIAL COHERENCY

This application is a continuation of U.S. patent application Ser. No. 10/050,148, filed Jan. 18, 2002 now U.S. Pat. No. 7,006,687 and claims priority to Korean Patent Application No. 2985/2001 filed Jan. 18, 2001.

BACKGROUND OF THE INVENTION

1. Field of the Invention

The present invention relates to multimedia search. Particularly, the present invention relates to a method for setting a dominant color, where the dominant color is included as a feature for searching the multimedia data.

2. Description of the Related Art

In a traditional image search system, it suggests a method for setting a dominant color of images that the images are divided into n×m number of grids, color histograms are obtained for each divided cell, and a representative color having maximum bin of color histogram is designated as the dominant color of a particular region. In other cases, an average value of color histogram or a major hue vector is selected as the dominant color of the particular region.

To be short, the dominant color can be determined by a method of using an average color value of a given region; choosing one most frequently appeared color; choosing the n most frequently appeared colors; using a color that prevails in a designated region by more than p %, or using a histogram, and so forth.

Each method described above has relative advantages and disadvantages in its own way.

For instance, the method using histogram makes it possible to finely represent the color. However, it requires a lot of data and sometimes set the dominant color for colors occupying extremely small part of the region.

Another method taking a single average value is advantageous that it has abridged data information and is capable of performing a pre-filtering function in a content-based search. Unfortunately however, if the region is composed of a variety of colors, it is pretty hard to accurately represent the dominant color.

However, considering that the characteristics of images are usually diverse and that in most cases it is difficult to express various colors by a single color value, the method of expressing an image region using only one dominant color is rather inappropriate or insufficient to represent the entire characteristics of the images and to construct a precise image characteristic database, so that it causes a deterioration of a performance of an image search using such a characteristic database.

Moreover, a method of expressing a dominant color of a region based on a variety of colors not only occupies a lot of storage space, but also makes it difficult to precisely represent mutual relations among the colors. In many cases, it is also hard to determine the dominant color based on a color distribution of a given image region, and the dominant color value obtained by this method lacks precision.

Taking all the aforementioned problems into consideration, inventors of the present inventions introduced a new method for describing color information of a given image region, in which the image region is represented by several dominant colors and their frequencies (ratio of the dominant colors in a given region, percentage %), a spatial coherency (it is called as a 'reliability') for the dominant colors is defined, and such a reliability is used for the image search together with the dominant colors to improve performance of the image search. This method is described in Korean Patent Application No. 1999-3181 (corresponding to U.S. patent application Ser. No. 09/479,888 filed on Jan. 10, 2000 and PCT Application No. PCT/KR99/00849 filed on Dec. 31, 1999) and Korean Patent Application No. 1999-26784 (corresponding to U.S. patent application Ser. No. 09/609,392 and PCT Application No. PCT/KR00/00710, both filed on Jul. 3, 2000.

Here, the spatial coherency can be a clue or information how much the dominant colors of the given image region are reliable, and it also indicates how densely the dominant colors are mixed together in the image region.

Therefore, when the spatial coherency is defined together with the dominant color, one can find out how reliable the dominant color thereof is at the time of the image search, and based on this, more improved search can be realized.

As a result, it is concluded that performance of the image search is greatly influenced by how precisely the spatial coherency represents the reliability of the dominant color.

Therefore, it is evident that a simple uniform quantization of the spatial coherency is not sufficient to reflect the diverse characteristics of the images. Thus, a more improved quantization scheme of the spatial coherency is required.

SUMMARY OF THE INVENTION

Accordingly, the present invention is directed to a method for setting a dominant color that substantially obviates one or more problems due to limitations and disadvantages of the related art.

An object of the present invention to provide a method for setting a dominant color using a spatial coherency of the dominant color to improve performance of a multimedia data search especially when the dominant color is used as a feature of the multimedia data.

To achieve the above object and other advantages and in accordance with the purpose of the invention, as embodied and broadly described herein, there is provided a method for quantizing spatial coherency of a dominant color of an image region that includes non-uniformly quantizing a normalized value for the spatial coherency responsive to a relationship between the normalized spatial coherency value and a prescribed threshold.

To further achieve the above object and other advantages and in accordance with the purpose of the invention, as embodied and broadly described herein, there is provided a method for quantizing spatial coherency of at least one dominant color of an image region that includes normalizing a weighted sum of per-dominant color-spatial coherencies from 0 to 1 and non-uniformly quantizing the normalized spatial coherency to a range from 1 to 31, wherein the normalized values of spatial coherency less than 0.7 are set to a quantized value of 1, and wherein the normalized values of spatial coherency from 0.7 to 1 are uniformly quantized to the quantized range from 2 to 31.

To further achieve the above object and other advantages and in accordance with the purpose of the invention, as embodied and broadly described herein, there is provided a method for describing an image region by using at least one dominant color and a spatial coherency on the at least one dominant color that includes describing a normalized spatial coherency of at least one dominant color using 31 bins by quantizing normalized values of spatial coherency less than 0.7 to a quantized value of 1, and uniformly quantizing the normalized values of spatial coherency from 0.7 to 1 to the quantized range from 2 to 31.

It is to be understood that both the foregoing general description and the following detailed description of the present invention are exemplary and explanatory and are intended to provide further explanation of the invention as claimed.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore not to be considered limiting of its scope, the invention will be described with additional specificity and detail through use of the accompanying drawings in which:

DETAILED DESCRIPTION OF THE PREFERRED EMBODIMENT

Figure 1:
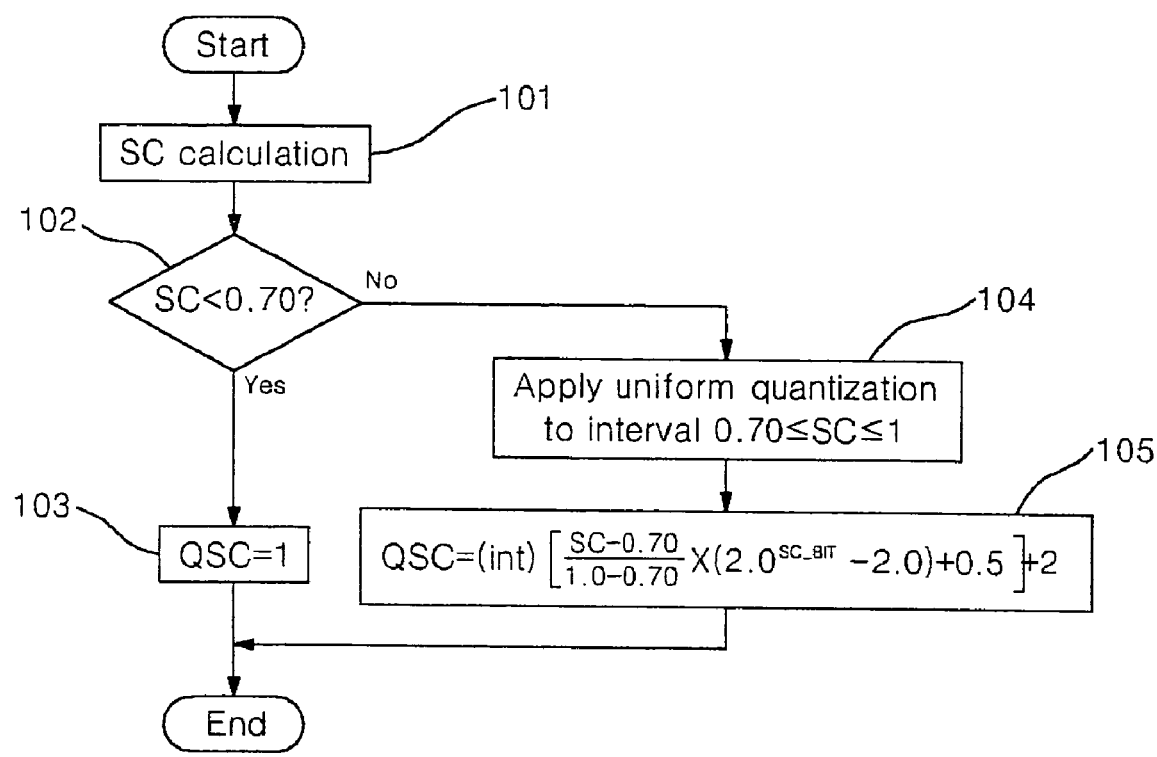
FIG. 1 is a flow chart showing a quantization scheme of a spatial coherency in accordance with a first embodiment of the present invention for setting a dominant color.
Figure 2:
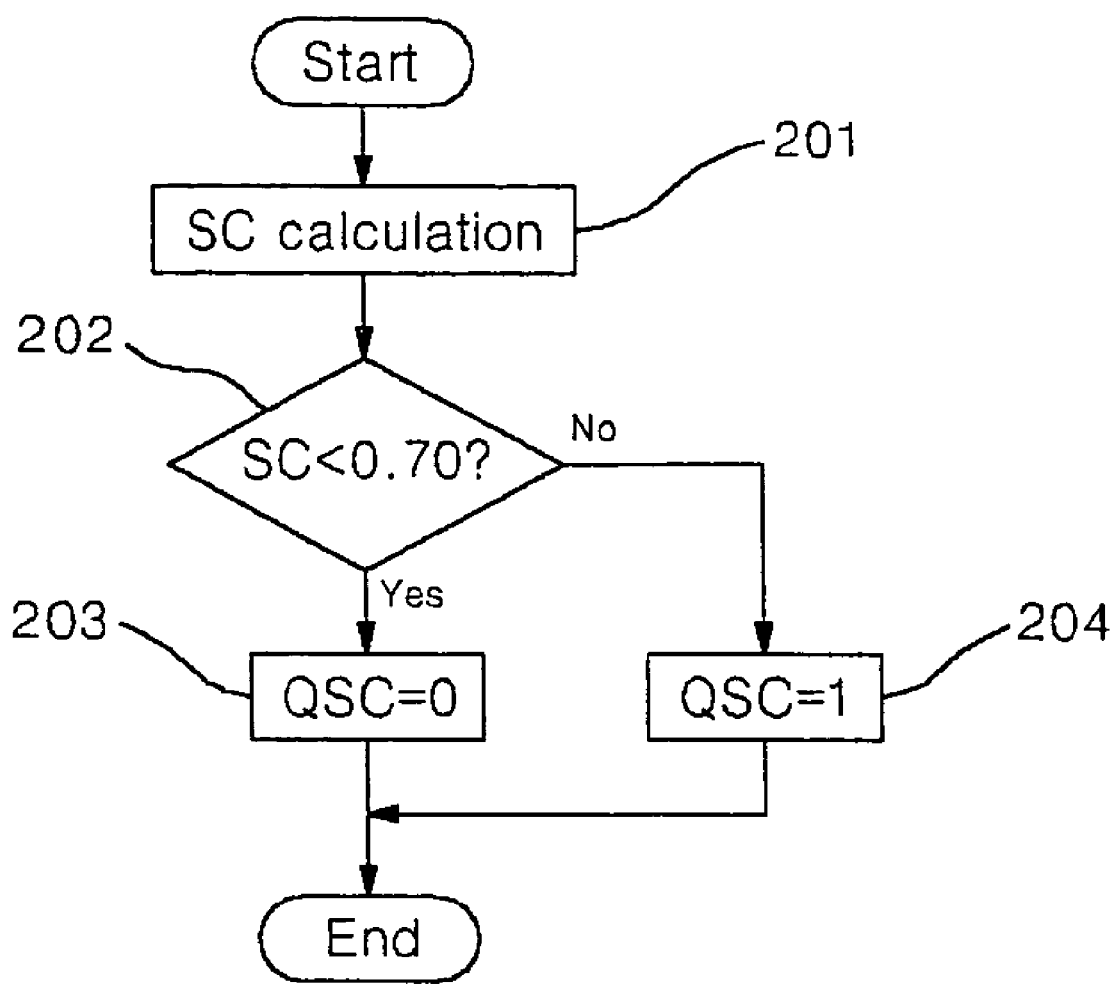
FIG. 2 is a flow chart showing a quantization scheme of a spatial coherency in accordance with a second embodiment of the present invention for setting a dominant color.
Figure 3:
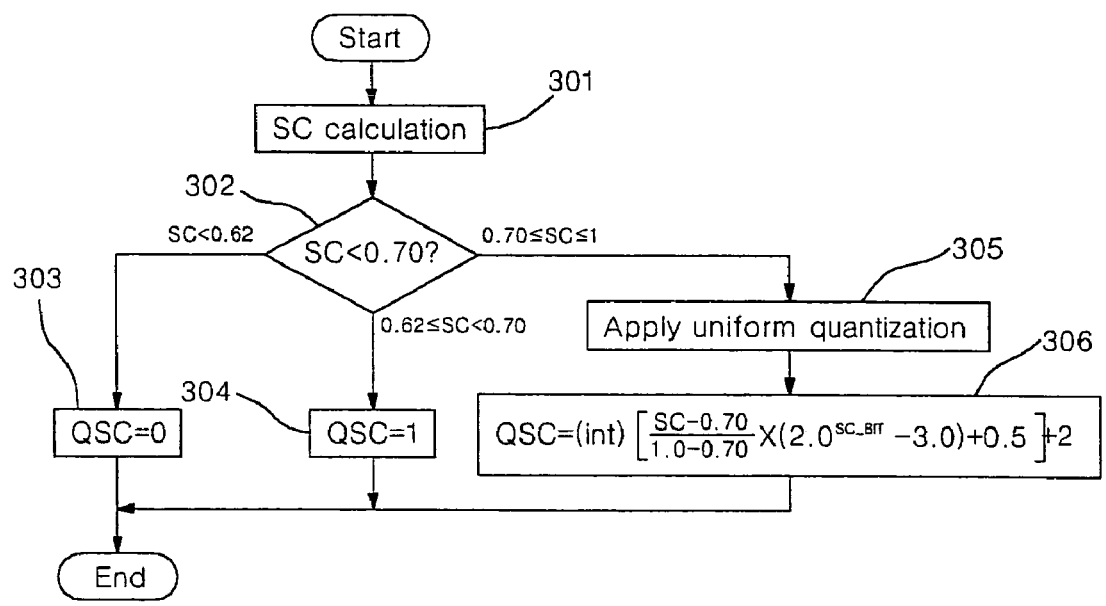
FIG. 3 is a flow chart showing a quantization scheme of a spatial coherency in accordance with a third embodiment of the present invention for setting a dominant color.

The following detailed description of the embodiments of the present invention, as represented in FIGS. 1–3, is not intended to limit the scope of the invention, as claimed, but is merely representative of the presently preferred embodiments of the invention. In the description, same drawing reference numerals are used for the same elements even in different drawings. The matters defined in the description are nothing but the ones provided to assist in a comprehensive understanding of the invention. Thus, it is apparent that the present invention can be carried out without those defined matters. Also, well-known functions or constructions are not described in detail since they would obscure the invention in unnecessary detail.

The present invention suggests a method for setting a dominant color especially when a dominant color of a given image region and a spatial coherency (SC) of the dominant color are expressed together, in which the method includes steps of comparing the spatial coherency with a predetermined threshold, and non-uniformly quantizing the spatial coherency by mapping a quantized spatial coherency (QSC) corresponding to the spatial coherency based on the comparison result of the spatial coherency with the predetermined threshold.

Preferably, the spatial coherency is normalized from real number 0 to 1 and the threshold used in the method of the present invention is set to 0.70.

If the quantized spatial coherency (QSC) is '0', it means that the spatial coherency is not valid.

On the other hand, if the spatial coherency is smaller than the threshold, 0.70, the quantization value for the corresponding spatial coherency is mapped into '1' (QSC =1), while a uniform quantization is applied to the region having the spatial coherency from 0.70 to 1 as many as the number of the remaining quantization values. Here, the uniform quantization is performed based on the following formula:

Quantized Spatial Coherency $(QSC)=(int)[(SC-0.7)/(1.0-0.7) \times (2.0^{SC\_BIT}-2.0)+0.5]+2$, wherein the SC_BIT denotes a number of bit assigned to the quantization.

In one embodiment of the present invention, the spatial coherency is quantized into 1 bit, and if the spatial coherency is smaller than the threshold, 0.70, the QSC becomes zero while, if the spatial coherency is greater than the threshold, 0.70, the QSC becomes 1.

Preferably, the threshold employed in the present invention may be set by two threshold values, i.e. a first threshold, 0.62, and a second threshold, 0.70.

In another embodiment of the present invention, the spatial coherency is quantized into 2 bits or more, and if the spatial coherency at this time is less than 0.62 (SC<0.62), the QSC becomes zero. On the other hand, if the spatial coherency is between 0.62 and 0.70 ($0.62 \leq SC \leq 0.70$), the QSC is 1, and if the spatial coherency is 0.70 and above ($SC \geq 0.70$), the uniform quantization is applied to the region having the threshold from 0.70 to 1 as many as the number of the remaining quantization values. Similar to the above, the uniform quantization is performed based on the following formula:

Quantized Spatial Coherency $(QSC)=(int)[(SC-0.7)/(1.0-0.7) \times (2.0^{SC\_BIT}-3.0)+0.5]+2$, wherein the SC_BIT denotes a bit number assigned to the quantization and it is two bits or more than two bits ($SC\_BIT \geq 2$).

The method for setting a dominant color using a spatial coherency is now explained with reference to the relevant figures.

As described above, the primary goal of the method is to enhance performance of the image search by representing an image region based on several dominant colors, their frequencies (percentage of the dominant colors in a given region) and spatial coherencies corresponding to the dominant colors, and by exploiting the spatial coherencies with the dominant colors during a multimedia data search.

Typically used methods for setting the dominant color includes a method for using an average color value of a region, a method for representing the dominant color by the most frequently appearing color, a method for representing the dominant color by the n most frequently appeared colors (n is a predetermined number), a method for using a color occupying more than p% in a designated region, or a method using a histogram.

Preferably, the spatial coherency is expressed by a single value for whole dominant colors of a region or an image (SC: Spatial Coherency for whole dominant colors).

As mentioned before, the spatial coherency value of the present invention is non-uniformly quantized to improve performance of the image search.

Here, the spatial coherency, SC, is obtained based on the following formula:

$SC = \Sigma_{for\ all\ i}(COH\_Ci \times COUNT\_PELS\_Ci/TOTAL\_PELS\_OF\_R$ wherein, COH_Ci is the per-dominant color coherency of Ci; COUNT_PELS_Ci is the number of pixels of Ci in the region R; and TOTAL_PELS_OF_R is the size of the region R calculated by counting pixels in the region R.

In order to obtain the spatial coherency, the spatial coherency value is first designated to an initial value '0' (Set SC=0), and a variable for counting the pixel value (SUM_COUNG_PELS) is designated to '0'.

After that, VISITED PELp=FALSE is designated for all pixels in the given region R, and then COH_Ci and COUNT_PELS_Ci are obtained in consideration of the whole dominant colors (Ci).

To get final spatial coherency, SC is added by COH_Ci× COUNT_PELS_Ci (i.e., SC=SC+COH_Ci×COUNT_PELS_Ci), and is divided by TOTAL_PELS_OF_R (i.e., SC=SC/TOTAL_PELS_OF_R).

Specifically, the COH_Ci (per-dominant color coherency of Ci) and the COUNT_PELS_Ci are obtained as follows.

To begin with, a size of a coherency checking mask (CCM) is determined. For example, the CCM is obtained by multiplying CCM_WIDTH (=3) and CCM_HEIGHT (=3). The initial COUNT_PELS_Ci is set zero (0), and TOTAL_NUM_COHERENT is also set zero (0). For the whole pixel PELj in the region R, if the relation, Ci==COLOR_OF_PELj & VISITED_PELj==FALSE is satisfied, the VISITED_PELj is TRUE (i.e., VISITED_PELj=TRUE), and the COUNT_PELS_Ci is increased by 1 (i.e., COUNT_PELS_Ci=COUNT_PELS_Ci+1). And, the PELj is adjusted to the center of the CCM for the following operations.

Except for the central pixel PELj, if Ci==COLOR_OF_MASKED_PIXELk for all the other masked pixels (MASKED_PIXELk), the value of TOTAL NUM COHERENT is increased by 1.

Next, the COH_Ci is calculated using the formula, COH_Ci=TOTAL_NUM_COHERENT/COUNT_PELS_Ci/(CCM_WIDTH*CCM_HEIGHT−1). Then, using the obtained COH_Ci and the COUNT_PELS_Ci, the spatial coherency is obtained based on the formula, $\Sigma_{for\ all\ i}$ (COH_Ci×COUNT_PELS_Ci/TOTAL_PELS_OF_R).

The spatial coherency determined by the above algorithm is normalized by a real number between 0 and 1. The final spatial coherency is then quantized into 1 bit, 2 bits, 3 bits, 4 bits or 5 bits.

For example, if the spatial coherency is quantized into 1 bit, the QSC (quantized spatial coherency) takes a value of 0 or 1; if the spatial coherency is quantized into 2 bits, the QSC (quantized spatial coherency) has a value out of 0, 1, 2 or 3; if the spatial coherency is quantized into 3 bits, the QSC (quantized spatial coherency) has a value out of 0, 1, 2, 3, 4, 5, 6, or 7; if the spatial coherency is quantized into 4 bits, the QSC (quantized spatial coherency) has a value out of 0, 1, 2, . . . , 14 or 15; and if the spatial coherency is quantized into 5 bits, the QSC (quantized spatial coherency) has a value out of 0, 1, 2, . . . , 30 or 31.

Therefore, the quantization scheme of the spatial coherency is largely categorized into a uniform quantization scheme in which the spatial coherency is uniformly divided from 0 to 1 for mapping each quantized value, and a non-uniform quantization scheme in which the section between 0 and 1 is non-uniformly divided for mapping each quantized value. Preferably, the non-uniform quantization scheme is applied to the present invention for improving the search function even when relatively small bit numbers are used.

More specifically, the non-uniform quantization scheme of the spatial coherency according to the present invention is divided into a case of using '0' for the quantization value, and a case of excluding (not using) '0' for the quantization value.

In some cases, '0' is not used for the quantization value because '0' is already used for implying another, namely, 'SC is not valid'. For instance, when the spatial coherency is quantized into 2 bits, the QSC (quantized spatial coherency) is mappinged over 1, 2 or 3.

FIG. 1 illustrates a first embodiment of the present invention where '0' is not used for the quantization value, and the threshold, 0.70, is used for the non-uniform quantization.

First of all, the spatial coherency is calculated (S101). Then, the spatial coherency is compared with the threshold, 0.70 (S102). If the spatial coherency is smaller than 0.70, the QSC is mappinged into 1 (S103), while if the spatial coherency is greater than the threshold, 0.70, a uniform quantization is proceeded to a region having the spatial coherency from 0.70 to 1 as many as the number of the remaining quantization (S104).

In other words, the QSC is uniformly quantized based on the following formula (S105):

$$(QSC)=(int)[(SC-0.7)/(1.0-0.7)\times(2.0^{SC\_BIT}-2.0)+0.5]+2$$

wherein, SC_BIT is the number of bits assigned to the quantization. For example, the SC_BIT can be 2 bits, 3 bits, 4 bits or 5 bits.

FIG. 2 and FIG. 3 illustrate methods of quantizing the spatial coherency using the quantization value '0' in accordance with the second embodiment and the third embodiment of the present invention.

If the spatial coherency is quantized using the quantization value 0, the quantized spatial coherency can be expressed in a way that the quantization value '0' is included. For example, if the spatial coherency is quantized into 2 bits, the quantized spatial coherency (QSC) is mapped into 0, 1, 2 or 3.

Particularly, FIG. 2 illustrates the method of quantizing the spatial coherency using the quantization value '0' and using 1 bit only.

Referring to FIG. 2, the spatial coherency is first calculated (S201), and is then compared with the threshold, 0.70 (S202).

As a result of the comparison, if the spatial coherency is smaller than 0.70, the QSC is mapped into a quantization value of 0. Meanwhile, if the spatial coherency is greater than 0.70, the QSC is mapped into a quantization value of 1.

On the other hand, the third embodiment shown in the FIG. 3 shows the method of obtaining quantized spatial coherency (QSC), especially when the spatial coherency is quantized using greater than 1 bit, such as, 2 bits, 3 bits, 4 bits or 5 bits.

Again, the spatial coherency is first calculated (S301) like before, but is compared with the thresholds, 0.62 and 0.70 at this time (S302).

If the spatial coherency is smaller than 0.62, the QSC is mapped into the quantization value 0 (S303), and if the spatial coherency is greater or equal to 0.62 and is smaller than 0.70 (0.62≦SC<0.70), the QSC is mapped into the quantization value 1 (S304).

In the meantime, if the spatial coherency is greater or equal to 0.70, the non-uniform quantization is applied to the region having the spatial coherency from 0.70 to 1 as many as the number of the remaining quantization (S305).

In other words, the QSC is uniformly quantized based on the following formula (S305):

$$(QSC)=(int)[(SC-0.7)/(1.0-0.7)\times(2.0^{SC\_BIT}-3.0)+0.5]+2$$

wherein, SC_BIT is the number of bits assigned to the quantization. For example, the SC_BIT can be 2 bits, 3 bits, 4 bits or 5 bits.

As explained before, when a certain image or an image region is represented by a dominant color, if the frequency of the dominant color and the spatial coherency of the dominant color are expressed together with the dominant color, and if the spatial coherency is non-uniformly quantized, it is possible to improve the performance of image search even if the relatively small bit numbers are employed.

For a better image search using information on a dominant color (the dominant color value, the frequency of the color, and the spatial coherency of the color), a certain image region (or the whole image) can be compared with another image region. That is, several dominant colors extracted from each image region, the frequencies of the dominant colors, and the spatial coherency values on the dominant colors are matched to one another for the comparison.

To do so, the difference, Diff (D1, D2), for reflecting the similarity between the two image regions (or the whole images) to be compared is calculated using the formula:

$$Diff(D1, D2) = W1 \times SC\_Diff \times DC\_Diff + W2 \times DC\_Diff$$

In this way, it is searched how similar the two image regions (or the whole images) are.

In the formula, the W1 denotes a weight on the SC_Diff. For example, the W1 can be designated to 0.3 (W1=0.3). However, if the spatial coherency is not valid, the W1 is designated to 0 (W1=0). Similarly, the W2 denotes a weight on the second item on the right hand side, DC_Diff For instance, W2 can be designated to 0.7 (W2=0.7).

Here, the SC_Diff is an absolute value of the difference of each spatial coherency of two image regions (or the whole images) to be compared, and the DC_Diff is the difference between the dominant color values of two image regions (or the whole images) to be compared.

In conclusion, the present invention is advantageous for improving performance of the search, particularly during the image search, by expressing the dominant color for an image search together with the frequency and the spatial coherency thereof, in which the spatial coherency is non-uniformly quantized based on the predetermined threshold. Thus, even if the relatively small bit numbers are employed, the spatial coherency can represent how reliable the dominant color is and it provides more improved performance of image search.

While the invention has been described in conjunction with various embodiments, they are illustrative only. Accordingly, many alternative, modifications and variations will be apparent to persons skilled in the art in light of the foregoing detailed description. The foregoing description is intended to embrace all such alternatives and variations falling with the spirit and broad scope of the appended claims.

What is claimed is:

1. A method for quantizing spatial coherency of a dominant color of an image region, comprising:
    non-uniformly quantizing a normalized value for the spatial coherency responsive to a relationship between the normalized spatial coherency value and a prescribed threshold.

2. A method for quantizing spatial coherency of at least one dominant color of an image region, comprising:
    normalizing a weighted sum of per-dominant color-spatial coherencies from 0 to 1; and
    non-uniformly quantizing the normalized spatial coherency to a range from 1 to 31, wherein the normalized values of spatial coherency less than 0.7 are set to a quantized value of 1, and wherein the normalized values of spatial coherency from 0.7 to 1 are uniformly quantized to the quantized range from 2 to 31.

3. The method of claim 2, wherein the weight is proportional to a number of pixels corresponding to each dominant color of the region.

4. A method for describing an image region by using at least one dominant color and a spatial coherency on said at least one dominant color, comprising:
    describing a normalized spatial coherency of at least one dominant color using 31 bins by:
        quantizing normalized values of spatial coherency less than 0.7 to a quantized value of 1, and uniformly quantizing the normalized values of spatial coherency from 0.7 to 1 to the quantized range from 2 to 31.

5. The method of claim 4, comprising assigning predetermined number of bits to the spatial coherencies by 5 bits, wherein the 5 bits is used to represent the integer of the range from 0 to 31.

6. The method of claim 4, comprising:
    normalizing the spatial coherency from 0 to 1; and
    assigning predetermined number of bits to the spatial coherencies by 5 bits, wherein the 5 bits is used to represent the integer of the range from 0 to 31.

* * * * *